Nov. 3, 1936. G. E. PICKUP 2,059,272
OVEN THERMOMETER
Filed Jan. 4, 1935
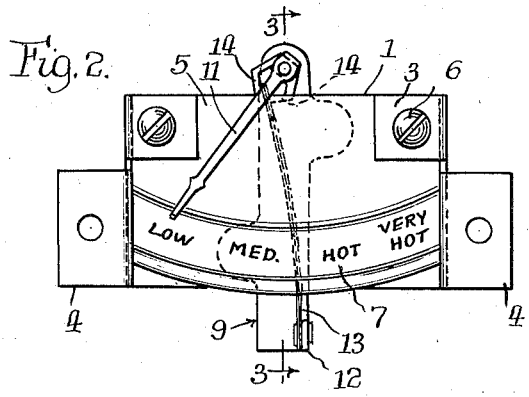
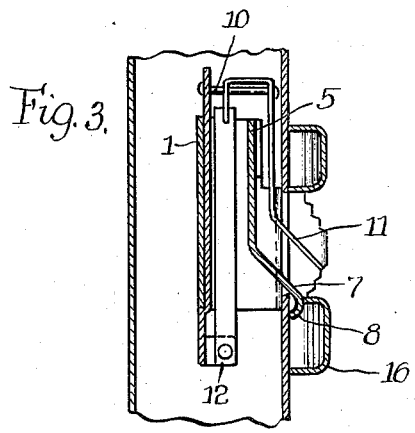
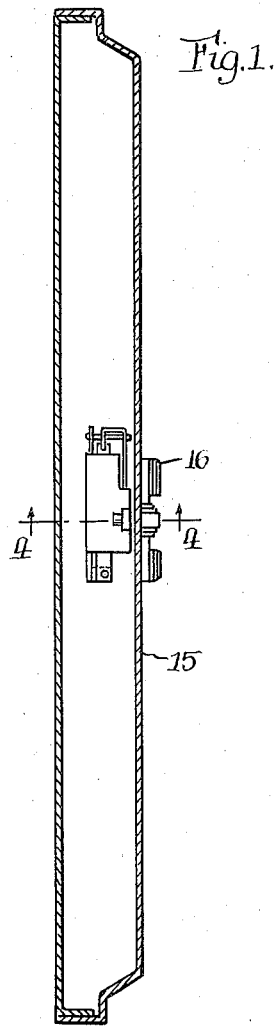
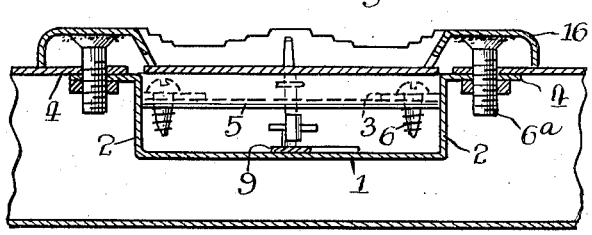
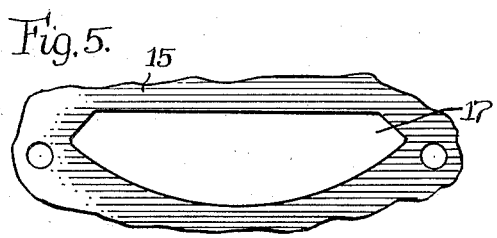
Inventor:
George E. Pickup Patented Nov. 3, 1936

2,059,272

UNITED STATES PATENT OFFICE 2,059,272

OVEN THERMOMETER

George E. Pickup, Newark, Ohio, assignor to The Wehrle Company, Newark, Ohio, a corporation of Ohio Application January 4, 1935, Serial No. 351

12 Claims. (Cl. 73—119)

This invention relates to oven thermometers and has particular reference to oven thermometers adapted to give visual indication of oven temperatures at points outside of the ovens.

The general object of the invention is to provide a new and improved thermometer of this character which is simple in construction, of attractive appearance, and which can be manufactured inexpensively.

Another object of the invention is to provide an oven thermometer of novel unitary construction permitting its installation by a simple and easily performed operation.

Other objects and advantages will become apparent from the following description taken in connection with the accompanying drawing, in which:

Figure 1 is a side elevational view of an oven thermometer embodying the invention as mounted on an oven door.

Fig. 2 is a front elevational view of a preferred form of the thermometer mechanism.

Fig. 3 is a vertical sectional view thereof taken approximately on the line 3—3 of Fig. 2, portions of the oven body on which the thermometer is mounted and the escutcheon plate partially covering the same also being shown.

Fig. 4 is a sectional view of the thermometer and associated parts taken approximately on the line 4—4 of Fig. 1.

Fig. 5 is a fragmentary front view of an oven wall illustrating the manner in which the wall is cut away to provide for the installation of the thermometer.

While the invention is susceptible of various modifications and alternative constructions, I have shown in the drawing and will herein describe a preferred embodiment, but it is to be understood that I do not thereby intend to limit the invention to the specific form disclosed, but intend to cover all modifications and alternative constructions falling within the spirit and scope of the invention as expressed in the appended claims.

In carrying out my invention, the thermometer is preferably mounted on the inner side of and behind an aperture in the front wall of an oven door or other part of the oven having spaced front and rear walls. The thermometer mechanism is disposed in the space between the two walls with a portion at its dial plate projecting laterally through the aperture in the front wall. The dial plate and wall thus define a passage communicating with the aperture. Through this passage extends the thermally actuated indicator arm of the thermometer with its lower end projecting through the aperture. The indicator arm is pivoted so that its projecting end swings over the dial portion of the dial plate and in cooperation with the legend appearing on the plate, indicates the temperature of the oven. A suitable frame or escutcheon plate masks the edges of the aperture and dial plate and exposes the dial portion of the dial plate and the projecting end of the indicator arm to view. Installation of the thermometer is facilitated by its unitary construction which permits both the escutcheon plate and thermometer to be held in place by two bolts passing through the oven wall.

As herein illustrated, the thermometer comprises a main supporting plate 1 having its ends 2 bent outwardly at approximately right angles to the body of the plate. Each of the ends terminates in an inwardly extending flange 3 and an outwardly extending flange 4. These flanges lie in planes substantially parallel to the body of the plate, with the flanges 4 being spaced somewhat farther from the plate than the flanges 3.

The flanges 3 provide a base for supporting an indicator dial plate 5 attached thereto in any suitable manner as by self-tapping screws 6 as shown in the drawing. The dial plate is formed with a flat upper portion and an arcuate outwardly sloping lower or dial portion 7 having an inwardly curving flange 8 along the lower edge. The plate is so proportioned that the dial portion 7 extends slightly beyond the plane of the flanges 4. The face of the plate is preferably enameled or otherwise finished to present an attractive appearance and designations indicative of oven temperatures are stamped or printed on the dial portion.

The thermally actuated mechanism of the thermometer is carried by a vertical base member 9 spot-welded or otherwise rigidly attached to the plate 1 transversely thereof. The upper end of the member 9 extends above the upper edge of the plate and serves as a support for a bearing or pivot pin 10 on which an indicator arm 11 is pivoted. The lower end of the member 9 projects below the lower edge of the plate 1 and is provided with an outwardly extending flange 12 for supporting a thermally responsive bimetallic strip 13 which serves to actuate the indicator arm.

The indicator arm 11 preferably comprises a relatively long thin indicating member or pointer having its lower end bent outwardly at substantially the same angle as the dial portion of the dial plate. The upper end of the arm is bent inwardly in a generally U-shaped form providing a relatively short rear leg. Both the upper end of the pointer and the rear leg are somewhat enlarged and are perforated to form spaced bearings for the reception of the pivot pin 10. The rear leg is slotted to form two depending, inwardly sloping legs 14 designed to bear loosely against opposite sides of the bimetal strip 13. The flexing of the strip 13 in response to temperature variations swings the arm on the pivot 10, thereby causing the pointer to register with the proper designation on the dial plate.

In use, the thermometer mechanism is supported on the inner side of a wall 15 of an oven door by the flanges 4 and is held in place by the bolts 6a which are preferably rigidly attached to the underside of an escutcheon plate 16. The wall 15 is provided with a slot 17 (Fig. 5) of suitable size and shape to accommodate the dial portion 7 of the dial plate and to expose the legend appearing thereon. With the thermometer mounted, the dial plate projects laterally through and overhangs the lower edge of the slot 17 with the inner edge of flange 8 engaging the outer surface of the wall. The dial plate and wall thus define a communicating passage between the thermometer mechanism and the slot. The indicator arm 11 extends through this passage with its lower end projecting through the slot so that its position with respect to the designations on the dial plate can be seen conveniently.

The installation of the oven thermometer comprising the invention is extremely simple. The dial plate is first inserted through the slot on the oven wall and then the entire unit comprising the mechanism is slipped down until the dial plate engages the lower edge of the slot. The escutcheon plate is then placed over the front of the slot with the attached bolts projecting through the holes in the wall and supporting plate flanges. Nuts screwed onto the bolts then suffice to hold both the thermometer mechanism and escutcheon plate in place.

From the foregoing it will be apparent that the invention provides a very simple and inexpensive oven thermometer and one which, by reason of its unitary construction, can be installed with a minimum amount of labor.

I claim as my invention:

1. A thermometer for an oven door comprising, in combination, a main supporting plate having a pair of end members terminating in flanges, a dial plate having a flat body portion rigidly attached to said flanges and an inclined dial portion adapted to project through and overhang the edge of an aperture in the wall of the oven door, a thermally responsive indicating device mounted on one of said plates and including an arm adapted to ride over the inclined portion of the dial plate in spaced relation thereto, and an escutcheon plate secured to said main supporting plate and defining an opening exposing the portion of the dial plate over which the arm of the indicating device rides.

2. A thermometer for an oven door comprising, in combination, a main supporting plate, a dial plate secured to said plate and having an arcuate outwardly inclined dial portion adapted to project through and overhang the edge of an opening in the oven door, an indicator arm pivotally mounted on said main supporting plate to swing over the dial portion of the dial plate, a thermally actuated member mounted on said main supporting plate and adapted to position said arm in accordance with the temperature to which the member is heated, and an escutcheon plate secured to said main supporting frame and defining an aperture exposing the dial portion of the dial plate and a portion of said arm.

3. A thermometer for an oven door comprising, in combination, a main supporting plate having outwardly projecting end members each terminating on an inwardly extending flange and an outwardly extending flange, a dial plate having a flat upper portion secured to the inwardly extending flanges of said members and having an arcuate outwardly inclined dial portion bearing temperature designations, a base plate attached to said main supporting plate transversely thereof, an indicator pivotally mounted on one end of said base plate and having an arm extending over the dial portion of the dial plate, a thermally responsive element secured to the other end of said base plate and having its free end operatively engaging said indicator, and means including the outwardly extending flanges of the end members for rigidly securing the thermometer to an oven door.

4. A unitary thermometer assembly for an oven door comprising in combination, a main supporting plate, outwardly projecting end members formed integrally with said plate, an inwardly extending flange on each of said members, a dial plate rigidly attached to said inwardly extending flanges, an elongated base plate secured transversely of said main supporting plate and having upper and lower end portions extending beyond the edges of the supporting plate, an indicator arm pivotally mounted on the upper end portion of said base plate and having an elongated pointing member adapted to swing over said dial plate, an outwardly projecting flange on the lower end portion of said base plate, a thermo-flexible bimetallic strip secured at one end to said last mentioned flange and having its free end in operative engagement with said indicator arm, and an outwardly extending flange on each of said end members for supporting the thermometer unit on the wall of an oven door.

5. A thermometer for an oven door comprising, in combination, a main supporting plate having a pair of spaced flanges cooperating with the wall of an oven door, a dial plate having an outwardly inclined dial face with an anchoring flange at one edge, means attaching said plate to the main supporting plate in a position in which the inclined dial face projects laterally through an opening in the oven door wall with said anchoring flange overhanging the edge of the opening, a thermally responsive indicator device pivotally supported on one of said plates and including an arm having a portion projecting through said opening and riding over the dial face, and an escutcheon plate secured to said main supporting plate to conceal the edges of said opening in the oven wall and to define an opening exposing the dial face and the projecting portion of said arm.

6. A thermometer for an oven door comprising, in combination, a thermometer mechanism adapted to be mounted back of an aperture in the wall of an oven door, a dial plate having an upper portion spaced from the inner side of the wall and having an inclined lower dial portion projecting laterally through the aperture in the wall, a thermally actuated indicator arm extending through the passage defined by the dial plate and the wall and having an inclined end portion projecting through the aperture in spaced relation to the dial portion of the dial plate, and an escutcheon plate concealing the edges of the aperture and the projecting portion of the dial plate and defining a slot exposing said dial portion and the projecting end of said indicator arm.

7. A thermometer for an oven door comprising, in combination, a thermally actuated element adapted to be mounted on the inner side of an oven door wall, an aperture in the wall adjacent the element, a dial plate having a substantially flat back portion and an inclined dial portion, means supporting said plate with its back portion in spaced relation to the inner side of the wall and with its dial portion projecting laterally through the aperture in the wall whereby the plate and wall define a passage communicating with said aperture, an indicator arm extending through said passage and projecting through said aperture, and means operable by the thermally actuated element for moving the indicator arm over the dial portion of said plate to indicate the temperature of the oven.

8. A thermometer for an oven door comprising, in combination, a dial plate inclined with respect to the door so as to project laterally through an aperture in the wall of the door, an indicator arm disposed on the inner side of the door and having an outwardly bent end projecting through the aperture in the wall so as to ride over the projecting portion of the plate, means for positioning the end of the indicator arm with respect to designations appearing on the projecting portion of the plate in accordance with the temperature of the oven, and means supported on said wall defining an opening exposing the designations on said plate and the coacting portion of the indicator arm.

9. A thermometer adapted to be mounted back of an aperture in the wall of an oven door comprising, in combination, a thermally actuated indicator arm, a dial plate having a back portion spaced from the inner side of the wall and a dial portion projecting laterally through the aperture and overhanging the lower edge thereof, said plate and the wall defining a passage for the indicator arm to extend to and override the projecting portion of the plate, said projecting portion having designations for identifying oven temperatures as indicated by the position of the arm with respect to the plate, and means defining an opening exposing said designations and the coacting portion of said arm.

10. A thermometer for an oven door comprising, in combination, a main supporting plate, a dial plate having an anchoring portion secured to said main plate in spaced relation to the inner side of the outer door plate and having a dial portion adapted to project through an aperture in the wall of the door, a thermally responsive indicating device mounted on one of said plates and including a temperature indicating arm extending between said anchoring portion of the dial plate and the outer door plate and adapted to ride over the dial portion of the dial plate, and an escutcheon plate secured to said main supporting plate and defining an opening exposing the portion of the dial plate over which said indicating arm rides.

11. A thermometer for an oven door comprising in combination, a dial plate having a flat base portion supported on one side of the wall of the door in spaced relation thereto and having an inclined dial portion projecting through an aperture in the wall, an indicating arm adapted to swing over the projecting portion of the plate, and means for positioning said arm with respect to designations appearing on the projecting portion of the plate in accordance with the temperature of the oven.

12. The combination with an oven wall having an aperture therein, of a thermometer comprising a supporting plate adapted to be mounted on said wall adjacent the aperture therein with the supporting plate spaced from the inner surface of the wall, a dial plate having an anchoring portion secured to said supporting plate and disposed in spaced relation to the wall to define therewith a passage communicating with the aperture in the wall, said dial plate also having a dial portion projecting through said aperture, and a thermally responsive device supported on one of said plates and including an arm extending through said passage and said aperture with its free end riding over the dial portion of said dial plate.

GEORGE E. PICKUP.